United States Patent [19]
Levine

[11] Patent Number: 4,769,796
[45] Date of Patent: Sep. 6, 1988

[54] TIME MANAGEMENT SCHEDULER

[76] Inventor: Alfred B. Levine, 2924 Terrace Dr., Chevy Chase, Md. 20815

[21] Appl. No.: 22,238

[22] Filed: Mar. 5, 1987

Related U.S. Application Data

[63] Continuation of Ser. No. 580,158, Feb. 14, 1984, abandoned.

[51] Int. Cl.⁴ .................... G04B 19/24; G04B 45/00
[52] U.S. Cl. ........................................ 368/29; 368/41; 368/72; 368/82
[58] Field of Search .................. 368/19, 28-30, 368/41-44, 82-84, 239, 241, 242; 340/756-757, 798-799; 364/569, 200, 900

[56] References Cited

U.S. PATENT DOCUMENTS

| | | | |
|---|---|---|---|
| 3,999,050 | 12/1976 | Pitroda | 364/900 |
| 4,060,848 | 7/1971 | Hyatt | 364/200 |
| 4,162,610 | 7/1979 | Levine | 368/10 |
| 4,228,470 | 10/1980 | Rahman et al. | 360/4 |
| 4,303,995 | 12/1981 | Aizana | 568/28 |
| 4,379,641 | 4/1983 | Maezawa et al. | 368/261 |
| 4,485,463 | 11/1984 | Kita | 368/82 |
| 4,548,510 | 10/1985 | Levine | 368/10 |

Primary Examiner—Vit W. Miska

[57] ABSTRACT

An electronic time management scheduler for communicating the daily schedules, or daily subschedules of available time slots, for a series of different selected days in such manner that the user can quickly and easily select or determine a spaced program of different appointments on different days, or find the most convenient time for an appointment on any one of a series of different days. In one embodiment, the user selects each of the days of interest, and in a second embodiment selects merely the beginning day and the fixed daily interval between successive appointments. In a third embodiment or fully automatic mode, the user selects the days of interest, or the beginning day and interval between appointments, and the electronic scheduler automatically functions to find an available time slot, if present, on each day selected and communicates this program of appointments to the user.

22 Claims, 3 Drawing Sheets

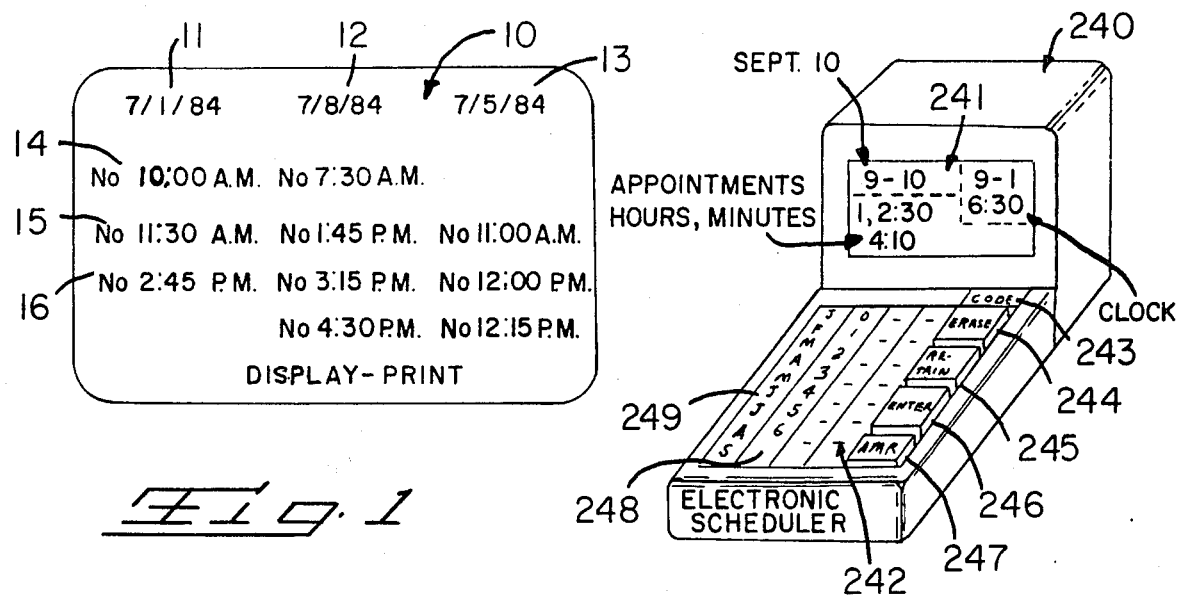
Fig. 1
Fig. 4
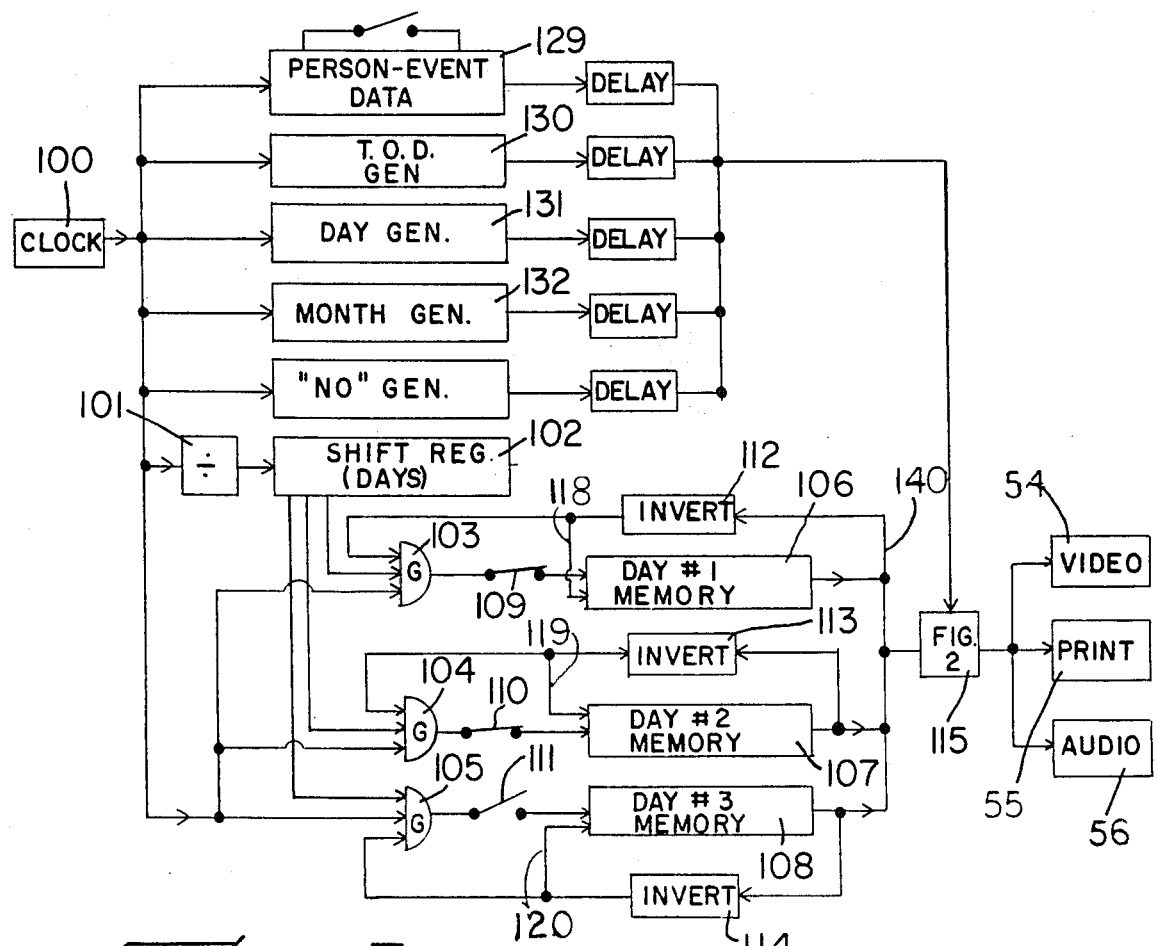
Fig. 3

TIME MANAGEMENT SCHEDULER

STATEMENT OF THE INVENTION

This is a continuation of Ser. No. 580,158 filed Feb. 14, 1984, now abandoned.

This invention generally relates to electronic appointment schedulers as set forth in earlier U.S. Pat. No. 4,162,610 and in copending application Ser. Nos. 566,312, filed Dec. 28, 1983, and 568,359, filed Jan. 5, 1984; and more particularly to such schedulers for communicating to the user the combined schedules or subschedules for a series of different days, in either a manual or automatic fashion.

BACKGROUND

In early U.S. Pat. No. 4,162,610, there is provided an electronic scheduler for enabling a user to randomly enter, change, or update appointment schedules for a series of different days in an electronic memory, and to selectively read-out and display the entire schedules for any desired day.

In later application Ser. No. 566,312 and still later Ser. No. 568,359, this scheduler is enhanced by providing a number of additional features including a copy print-out of the schedule, an audible announcement of the selected schedule, or combinations, along with a display. Still further, there is provided a read-out of daily subschedules of available time slots instead of, or in addition to, the schedules of appointments thereby assisting the user in scheduling future appointments and events. The user is permitted to select the manner of receiving the schedule or available time slot information whether visually, audibly, or in print-out; or in any combination thereof. The user can also choose whether to receive the daily schedules or subschedules, or both, whichever is most convenient for the purposes desired.

SUMMARY OF THE INVENTION

According to the present invention there is provided still additional features to assist the user in more easily and efficiently managing the use of time, and in keeping track of appointments and availabilities. One of such enhancements is to present to the user in combined form multiple daily schedules of appointments or daily subschedules, or both, so as to assist in determining sequences of different day appointments for a common person, place, or event. For example, where the user is a doctor, dentist, or other user providing a service to a number of different recipients, it is often necessary to schedule a sequence of appointments for the recipient over an extended time period, such as weekly or monthly appointments, either on a regular basis or otherwise. By selecting the series of different day of interest, and having the schedules or subschedules for that series of days presented concurrently, in side-by-side combined form or otherwise, the user can conveniently schedule a sequence of different day appointments for available time slots in the days of interest that are selected.

In an alternative embodiment, this multiple day scheduling can be performed in an automatic fashion, by providing automatically operating electronic read-out circuitry that interrogates the memorys for each of a series or selected days in chronological order and automatically locates an available time slot for each of the series of selected days. After locating each available time slot, the circuit terminates its automatic read-out for that day; communicates the available time slot to the user, and enters that time slot appointment into the memory for that day. Upon completing an automatic read-out for the entire sequence of different days chosen by the user, the user is presented with a completed multiple day appointment schedule, and this multiple day schedule has been automatically entered into the memory. Where the user seeks to schedule multiple appointments in a regular time sequence, (eg. weekly bimonthly, monthly, or other), the user need enter only the first day, or beginning day, together with the time period between appointments; and the circuitry automatically selects the other days and finds available time slots to fill the sequence of appointments, for that particular person, event, or place.

BRIEF DESCRIPTION OF THE DRAWINGS

FIG. 1 is a plan view showing a display screen with a combined series of daily subschedules for different days in a side-by-side arrangement, FIG. 3 is a functional electrical block diagram of a system embodiment for automatically determining and communicating an available time slot for each day for a series of different days selected by the user, FIG. 4 is a perspective view of a portable appointment scheduler, showing the external layout of components and the manner of use.

DETAILED DESCRIPTION OF PREFERRED EMBODIMENTS

Figure 2:
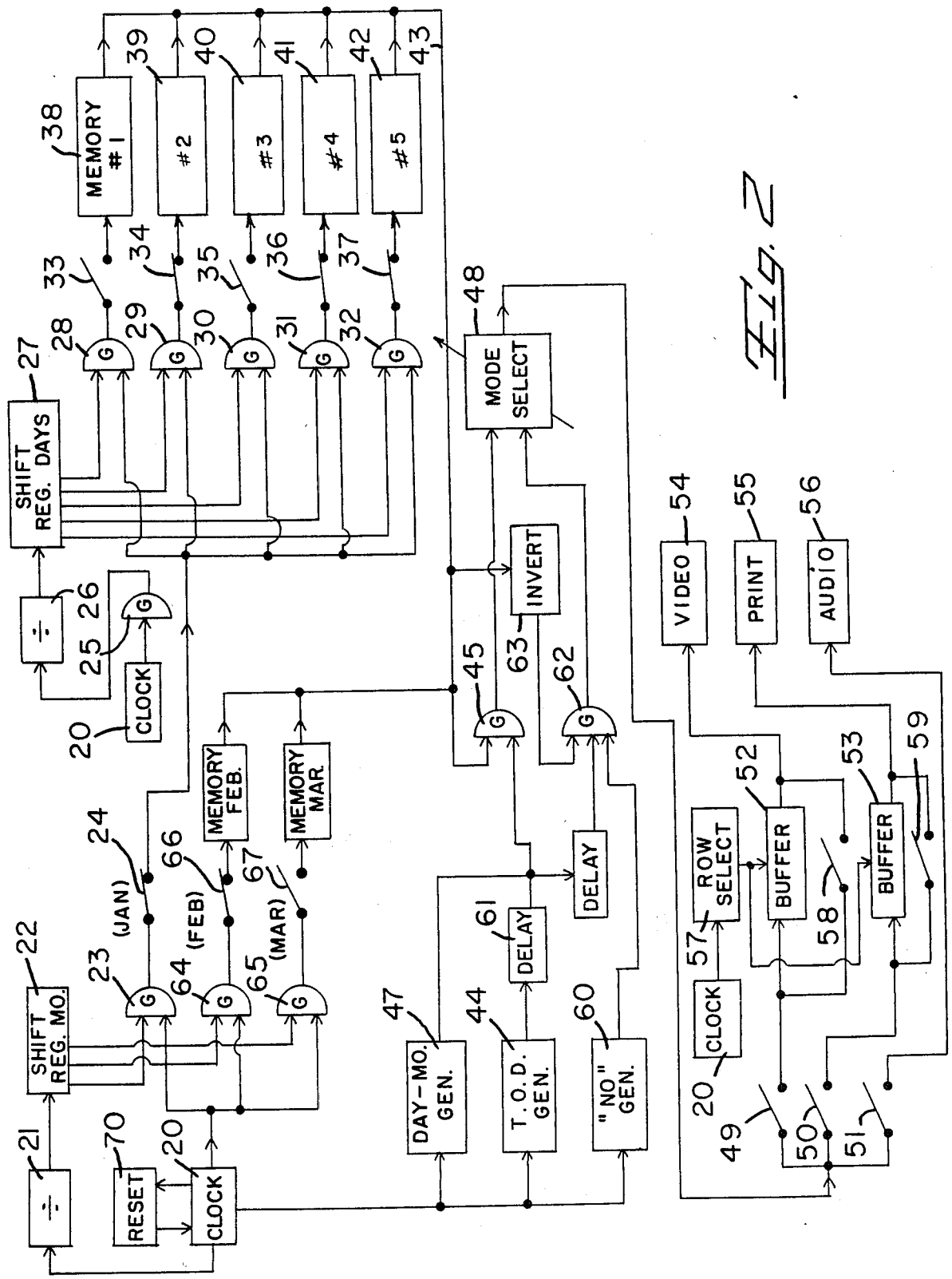
FIG. 2 is a functional electrical block diagram showing a system embodiment of the invention, for reading-out of the memorys the daily schedules or subschedules for a series of different days and communicating this information by any one or more of a visual display, a print-out or an audible announcement.

Referring to FIG. 1, there is shown a flat display screen, or printed record, for communicating to the user the combined daily appointment subschedules of available time slots for the three different days of July 1, 1984; July 8, 1984; and July 5, 1984, respectively. For the first day of July 1, indicated by 11 at the left of the screen 10, the time slots available for appointment by the user as shown in this example as being at 10 A.M.; 11:30 A.M. and at 2:45 P.M. For the next day of July 8, indicated by 12 in the center of the screen 10 or print-out, the available time slots are shown as being 7:30 A.M.; 1:45 P.M.; 3:15 P.M.; and 4:30 P.M. Similarly for the third selected day of July 5, 1984, shown at the far right of the screen or printout at 13, the subschedule of available time slots are at 11:00 A.M.; 12:00 P.M. and 12:15 P.M. Having these available time slots, or daily subschedules, for a series of the different days presented together, it is seen that the user can conveniently select a program of appointments for these different days for any particular person, place, or series of events. Thus, if a Spinologist or Chiropractor wishes to schedule a new patient for a series of appointments spaced a week apart, he merely calls up the combined daily subschedules of available time slots for the different days of interest, and quckly and conveniently sets up the appointments on these different days, if time slots are available. On the other hand if no time slots for any one or more of these days are free, the Chiropractor or Spinologist merely selects the display or print-out for alternate days until locating and setting up a desired schedule for the patient. Since the preferred embodiments are electronic, using electronic memory, as well as electronic display, or audible announcement, the daily subschedule desired is quickly retrieved from memory and presented to the user; and the user can quickly call up subschedules for alternate days, as required, until obtaining a multiday program of appointments that are convenient for both the user and the patient.

FIG. 4 externally illustrates a preferred portable scheduler, as contemplated by the present invention, and similar in physical appearance to that described in earlier U.S. Pat. No. 4,162,610, referred to above. As shown, the scheduler 240 may be small enough to be carried by hand and placed in a pocket or purse when not in use. It includes a keyboard 242 for entry and retrieval of the appointments each day for a series of different days, as well as for changing, updating, or canceling any previously made appointments. More specifically, keys 249 are provided for selecting the month; keys 248 for selecting the days, of the month, and additional keys 243 to 247, inclusive, for entering other data concerning the appointments or events, as well as for controlling the function desired such as entry, read-out, erase, and others. As also earlier disclosed, there is provided a flat display screen 241, that is preferably a large scale substantially flat LCD screen or other electronic display using plasma or luminescence, that is thin, and easily carried about, yet sufficiently large in facial display area to present the multiple series of daily schedules of appointments or plural daily subschedules as shown in FIG. 1, as well as displaying the time-of-day, month, and day and other information. A miniature thermal printer and audible ennunciator may also be provided as discussed below.

Referring to FIG. 2, there is shown one preferred system for selectively reading-out from the internal memory, the series of daily schedules or subschedules of available time slots for each of the different days selected by the user, and communicating these multiday appointment schedules in combined form in the display or print-out 10 as shown in FIG. 1. As will be appreciated, the daily schedules of appointment for each of the days selected have been previously entered into the memory by the user, or by another such as a secretary, as is disclosed in the earlier patent and in the earlier copending applications referred to above. As shown, the system includes a first series of keyboard operated switches 24, 66, and 67 for initially selecting the month of interest (January, February, and March, as shown), and a second series of keyboard operated switches 33 to 37, inclusive, for selecting the different days of interest. For an appointment scheduler adapted to cover a one year period, it will be understood that a total of twelve month switches, such as 24, will be provided together with a total of thirty-one (31) day switches for the different days of the month, (or a lesser number if only working days or weekdays are of interest for business applications).

The month switches, such as switch 24 shown, selectively connects the interrogation or read-out circuitry to the memory portion for January; and the day switches 33 to 37, subsequently connects this interrogation circuitry to the memory portions for the chosen days of that selected month. Tracing the system of FIG. 2 to obtain the entire daily appointment schedule for the day of January 2, for example, the user initially closes the keyboard switch 24, for January and then closes the keyboard day switch 34 to select the second day of January. The user thereafter closes the start or initiate read-out switch (not shown) to commence the read-out for January 2. A clock circuit 20 commences a regular sequence of interrogation pulses through a closed and gate 23 and thence through closed keyboard switch 24 (January) to the day memory circuitry. Upon reaching the day circuits, impulses are directed through and gate 29, and then through the closed selection switch 34 for January 2 to interrogate the day memory portion 39 containing the previously stored appointment entries for that second day. As disclosed in copending application Ser. No. 566,312, each of the daily memory sections, such as 39, contain a series of storage locations allocated to the different time slots of interest for that day, and each such different time slot location is interrogated in chronological order in response to successive clock pulses from clock 20. As each such location is interrogated in chronological sequence, output pulses are produced over output line 43 in the event that an appointment bit has been previously stored at that location in memory. However, if no appointment bit has been previously stored at that location, or time slot location, a different digital output signal is produced over output line 43 (eg. a "0" bit or a one "1" bit). These read-out pulses from memory 39 are directed to an and gate 45, and in the event of a correct output from memory 39 indicating a previous appointment at that time slot, the gate 45 is closed. Signals from the day-month generator 47 are passed through closed gate 45, along with time delayed signals from the time-of-day generator 44. Both the day-month generator 47 and the time-of-day generator 44 are driven by the same clock 20 in syncronism with the interrogation of the memory portion 39 whereby as each given time slot of the memory 39 is being interrogated, these generators are producing digital signals representing the correspondingly correct month and day, and time-of-day as the time slot of memory 39 under interrogation. In the event that an appointment has been stored at that time slot in memory 39, the month, day, and time-of-day signals are passed in sequence through the closed gate 45, and pass to the output circuit to be communicated to the user by any one or more of visual display 54, print-out 55, or audible announcement 56.

On the other hand, when an appointment has not been stored in the memory 39 at that time slot being interrogated, the different output over line 43 does not close the and gate 45 but instead is inverted by circuit 63 and closes a different and gate 62. Closure of the different and gate 62 passes a fixed message from generator 60, such as "No" to the output devices, informing the user that "No" appointment has been made for that time slot. Closure of and gate 62 also passes time delayed signals from the month-day generator 47, and those from the time-of-day generator 44 to the output devices after the "no" signal from generator 60. Thus the selected ones of the visual 54, 55 and/or audible output devices 56 inform the user that an appointment has "not" been scheduled for that time slot, followed by the month, day and time-of-day for that time slot, as generally shown in FIG. 1.

As disclosed in earlier application Ser. No. 568,359, the mode select circuit 48, is receptive to the output of and gates 45 and 62, and enables the user to receive either the entire daily schedule of previous appointments for the selected days, as passed through gate 45, or alternatively, the entire daily subschedule of available time slots for each selected day, as passed through gate 62. Still further, the mode select circuit 48, alternatively permits both the daily schedule and daily subschedule to be outputted. In the example of FIG. 1, only the daily subschedules of available time slots for the three selected days are presented for concurrent viewing or print-out, for assisting the user in making new appointments, and not the daily schedules.

Following the mode circuit 48, the desired one or both of the daily schedule or subschedule signals are directed to further keyboard operated selection switches 49, 50, and 51, that enable the user to choose the form of output desired, by one or more of visual display 54, print-out 55, or audible announcement 56, as previously disclosed in copending application Ser. No. 568,359 above. According to the present invention it is desired to present the daily schedules and/or daily subschedules for a series of different days in a combined manner as shown in FIG. 1. Therefore the user will select one or both of the visual display at 54 and/or the printer 55, both of which will be controlled, as described below, to present the multiple daily schedules or subschedules.

Returning to FIG. 2, for an understanding of the read-out and display of second, third, and any additional days selected by the user to provide a combined multiple day display as in FIG. 1, the read-out of each selected day memory is performed in chronological order. This sequence is controlled by a shift register circuit 27, and a series of gate circuits 28 to thirty two (32), each associated with a different one of the day memory portions 38 to 42, respectively. Shift register 27 is energized by the same clock generator 20, in synchronism with readout of the different memory portions but at a much lower frequency after passing the clock pulses through a frequency divider circuit 26. Each one of the different output lines of shift register 27 is energized in sequence at the lower speed or lower frequency of the divider 26, and each line remains energized for a time period commenserate with the read-out of its associated day memory portion, whereas all other lines of shift register output 27 are not so energized to prevent reading out of any of the other day memory portions. Each of these energized output lines, in turn, closes its associated one of gates 28 to 32, enabling the pulses from clock 20 to interrogate that day memory portion and to read-out the daily schedule or subschedule for that day. After completing the reading out of that days schedule, the shift register 27 is advanced to the next day position or output line to control read-out of its schedule or subschedule. However, since each of the gates 28 to 32 are in series circuit with a different one of the keyboard selection switches 33 to 37, that are selectively opened or closed by the user, the only day memory portions that are interrogated are those that have been selected by the user losing the proper ones of keyboard switchs 33 to 37. In the example shown in FIG. 2, only switches 34 (second day of month); 36 (fourth day); and 37 (fifth day) are closed to read-out the daily schedules or subschedules for those days only. Consequently, the shift register 27 and gates 28 to 37 control the read-out circuitry to sequentially read-out the day memory 39; then later the day memory 41, and finally the day memory 42, for the fifth day.

Briefly recapitulating the operation as thus far described, the user initially selects the month and then the series of different days of interest, and commences read-out of the daily memory bank portions. Upon closure of the switch for the month of interest, a bank of memories for the days of that month are allocated, and the further selection of days by keyboard switches further limits the read-out to only the days of interest in the selected month. A shift register circuit 27 driven at slower speed by the same sync. clock 20 enables each of the selected day memories to be interrogated in chronological order, and the schedules or subschedules of appointments for each such day are read out in chronological order for that day under control of the sync. circuitry.

For reading out the memories of days in other months, a similar procedure and circuitry is provided. A shift register circuit 22 together with a series of and gates 23, 64, and 67 is provided, with the month shift register 22 driven in syncronism by the same clock 20 but at a much slower speed or much lower frequency, through a pulse frequency divider 21. The and gates 23, 64, and 67 for these different months are also closed in time sequence, and in chronological order, to enable each month to be interrogated before beginning the read-out of the selected day memories for the next month. However, the memories for each month are read-out only if the keyboard selection switch 24, 66, and 67 for that month has been closed by the user.

Even though all of the day memory portions are read out in sequence in the disclosed embodiment, those skilled in the art will appreciate that that since the entire system (other than the printer) will be electronic, the real time involved is very short. Considering each daily memory as having only ten time slots per day, and requiring one read-out interrogation pulse per slot, a total read-out for an entire month will require a total of only 310 clock pulses. For a years read-out, a total of less than 3800 clock pulses will be required. At a low clock frequency of only 60 Hertz, the real time involved for read-out of all memory portions for an entire year would only be 70 seconds or about one minute. Furthermore the electronic day memories can be interrogated at a much higher speed or frequency than 60 Hertz, further reducing the total interrogation time to far less than one minute.

For displaying or printing a sequence of different daily suschedules or schedules as shown in FIG. 1 in a combined manner on different columns of a screen or print-out, as shown, the video display circuit 54 is provided with buffer storage 52 to receive each of the daily schedules or subschedules, for the selected days in time sequence and to separately store or buffer each days data for presentation in a different column. A row select control 57 for the buffer 52 enables shifting of the data after each daily schedule or subschedule has been entered, and the row select circuitry 57 is syncronized in operation with the receipt of the daily data by the same clock 20. In this manner, each of the selected daily schedules or subschedules of available time slots is entered, temporarily stored in buffer memory, and then displayed in a separate column or other desired arrangement, as illustrated in FIG. 1. In a similar manner, the printer 55 is provided with a buffer memory 53, controlled by the row select circuit 57, and controlled in syncronism with receipt of daily data by the clock 20 to print the sequence of daily schedules or subschedules, as shown. Where it is desired to display only one days schedule or subschedule at a time, or to print only a single days data, the by-pass switching circuitry 58 can be provided to remove the buffer memory 52 from the display, and a similar by-pass switching 59 can be employed to remove buffer memory 53 from the printer circuits.

FIG. 3 shows an automatically operating system for automatically scheduling appointments on a series of different days selected by the user. In this embodiment, the user selects the different days (and months) of interest by setting switches on the keyboard, and the system automatically interrogates the memory portion for each of the selected days in chronological order to find the first available time slot for each of said days. After completing the interrogation of all selected days, the program or multiday sequence of appointments has been automatically made and is communicated to the user, either visually at 118 by the display screen, or printed-out at 119 by the printer, or audibly announced at 120, all as discussed above.

Tracing the operation of the system for automatically scheduling appointments on the first and second days of a particular month, for example, the keyboard switches 109 and 110 are initially closed by the user for the two selected days and the system is placed in operation. Clock pulses from timing clock 100 pass through and gate 103 and through closed keyboard switch 109 to interrogate the memory section 106 for the first day of the selected month. Each of the time slots in memory 106 is sequentially interrogated in chronological order in response to the series of clock pulses until the first available time slot for that day is reached. At that interrogation, the output of memory 106 over line 140 is directed backwardly through inverter circuit 112 to the and gate 103 to deenergize gate 103 and prevent any further interrogation of day memory section 106. This time slot output on line 140 also passes to the gating and control circuitry of FIG. 2, indicated as 115, to be communicated to the user either visually at 54 or 55, or audibly at 56, or by any combination of these outputs selected by the user, as previously described. After completing the interrogation of the memory 106 for the first of the selected days, the and gate 104 is then operated by shift register 102 to automatically start the interrogation operations for the second day. In the event that the keyboard switch 110 for the second day has been closed by the user, the memory section 107 for the second day is then automatically interrogated in response to the regular series of received clock pulses from clock 100. In similar manner, each of the time slots in memory 107 is sequentially interrogated in chronological order until the first available or unused time slot is reached whereupon an output over line 140 is directed to inverter circuit 113 for the second day memory 107 to deenergize and gate 104 and prevent further interrogation of the second day memory 107. This time slot output on line 140 also passes to the gating and control circuitry 115 (FIG. 2) to the communication devices, where the first available time slot information for the second selected day is communicated to the user, as described above. In the same manner, each of the other selected day memory sections are interrogated in sequence by the operation of this circuitry in an automatic manner to obtain the first available time slot for each of the selected days, and these time slots are then communicated to the user. If desirer, this multiday appointment schedule may also be automatically entered into the memories for the selected days by applying the outputs of each of the inverter circuits, such as 112 and 113, in feedback to the read-in circuits for the associated daily memorys, concurrently with deenergizing of the AND gates associated with that day memory. Specifically, when the inverter circuit 112 is operated, it applies its output to and gate 103 to deenergize the gate 103 upon the first available time slot in memory 106 being found. This same output of inverter 112 is directed to the read-in circuit for memory section 106 to enter that appointment into the proper time slot in memory section 106, in addition to communicating that appointment to the user, as described above. In the same manner, each of the other inverter circuits 113 and 114 has its output connected in feedback to its associated day memory section to automatically enter that appointment into its memory, at the same time as it is being communicated to the user. In the event that the user may wish to enter each such appointment into the day memories in a manual fashion through the keyboard after first conferring with others who may be involved in making that appointment, switches (not shown) may be provided to disconnect the feedback from the inverters 112, 113, and 114 from the read-in circuits to their associated day memories.

For interrogating the different day memories 106, 107, 108, and others in sequence, as described above, a shift register 102 is employed having each of its time delayed output lines connected to the different ones of the and gates 103, 104, 105, and others, as shown. The shift register 102 is energized by the same clock 100, thereby to be syncronized in operation with the interrogation of the memories. More specifically, the shift register 102 is energized at lower frequency through a frequency divider 101 that reduces the frequency by the number of time slots to be interrogated for each day. Thus if each memory is to be interrogated for ten time slots for each day, the frequency divider 101 operates to reduce the clock frequency to the divider 101 by ten to one so that each memory can be interrogated in sequence in response to ten clock pulses before the next day memory is examined. After each ten clock pulses, the and gate for the next day memory is closed by the shift register 102 line and this next gate is interrogated by ten clock pulses to permit inquiry to be made of this next in line day memory. It will be appreciated, as shown, each of the and gates 103, 104, 105, and others, have two control inputs, as shown. The first input of each is energized by a different line of shift register 102, as described above, to control interrogation of that memory in time sequence. The second control input is from its associated inverter circuit, such as 112, 113, or 114, as described above, to terminate the interrogation of each day memory upon the first available time slot being found. Thus each of the day memories is interrogated automatically, in time sequence, until the first available time slot is found and then its associated gate is deenergized to prevent further interrogation.

The remaining portions of the circuitry of FIG. 3 are the same as those previously described above in FIG. 2, including a time-of-day generator 130, a day generator 131, and a month generator 132. Each of these generators are controlled by the timing clock 100 to generate month, day and T.O.D. signals the same as those produced by now conventional electronic watches and clocks, so that the month, day, and time of day are communicated to the user for each of time slots in the multiday schedule as shown in FIG. 1.

As previously disclosed in earlier U.S. Pat. No. 4,162,610 discussed above, additional information may be entered into the memory from the keyboard at 129, to identify the person, place, or event for each different appointment or time slot. The quantity of such additional information to be entered will, of course, depend upon the capacity of the memory bank that is provided in the unit. The output communicating devices, including visual display 54 printer 55 and audio ennunciator 56 are the same as those previously described in FIG. 2, as are the buffers and are the bypass switches or gates switches.

Although FIG. 3 discloses only three day memories and associated circuits it will be understood that additional day memories for all days in a month, and for a number of months, or even years, may be provided, depending upon the capacity of the system to be provided, its physical size, shape, cost and other factors.

In the event that the user's time is fully booked and that no time slots are available for appointment on any one or more of the days selected, the user may, of course, substitute different days on the keyboard for those first selected, and the system of FIG. 2 will interrogate and communicate those subscheduled time slots, if any, that are still available on the substitute days. Similarly, the user may substitute different days on the keyboard for those fully booked in the automatically operating system of FIG. 3, and receive an automatic read-out of the first available time slots on each of the substitute days.

In the event that the user wishes to automatically schedule appointments at a time slot other than the first available time slot for each selected day in FIG. 3, such as the second available slot, the third, or any other, this may be performed in a a automatic manner using a counter or adjustable counter (not shown) at the output of the inverter circuits, such as at the output of inverter 112 in FIG. 3, to select a different one of the available time slots. Since the inverter responds to each interrogation of the memory where no appointment has been previously stored, the use of the counter or an adjustable counter enables the user to select a different one of the available time slots, in an automatic fashion. Other logic circuitry will occur to those skilled in the digital arts to automatically select available any time slots for appointment without departing from the spirit and scope of this invention.

It will also be appreciated by those skilled in the art, that a multiple day display, or other communication of scheduling information, is useful and timesaving to the user even it it is desired to make only one appointment, rather than a series of appointments. For example, the user may first choose a series of different days when such an appointment can be made or is most convenient, and obtain a daily schedule or subschedule for the selected days in a multicolumn display as shown in FIG. 1. The user can then easily select the best or most convenient time slot from any of the displayed days that is still available from the multiple choices presented. These advantages are also available in the automatic system of FIG. 3, enabling the choice of the first available time slot on any one of the selected days.

In the system of FIG. 2 and also in the automatic system of FIG. 3, the user selects each particular month and day of that month of interest by depressing the corresponding month and day keys on the keyboard for each. However, it is often desired by Chiropractors or Spinologists, or others, to schedule a regular series of appointments for particular patients on a regular weekly, biweekly, monthly, or bimonthly basis, or even more frequently, in order to best benefit that patient. A system for performing this regular scheduling function is shown in FIG. 5.

Figure 5:
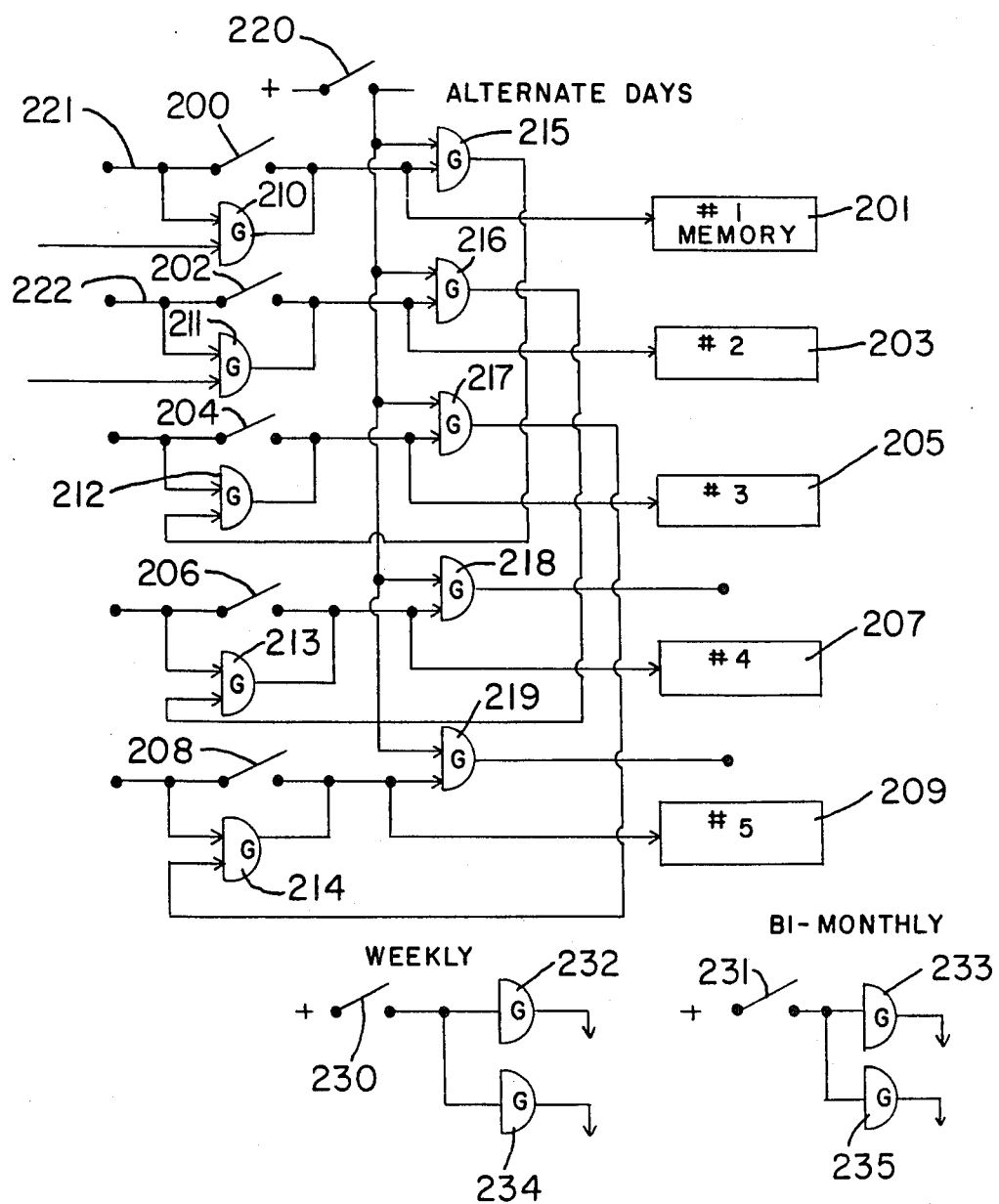
FIG. 5 is a functional electrical block diagram of a portion of a modified system for conveniently reading-out and communicating a series of daily schedules or subschedules for different days that are spaced apart on a regular time basis, such as on alternative days, or weekly, or other regular time period.

In FIG. 5, the keyboard day entry switches 200, 202, 204, 206, and 208 are shown for each day of a five day business week. In parallel with each such keyboard switch is provided an and gate circuit 210, 211, 213, and 214, respectively, and in series with each keyboard switch is provided an and gate 215, 216, 217, 218, and 219, respectively. When any one of the parallel and gate circuits is operated, it bypasses or short circuits its corresponding keyboard switch, and the operation of any one of the series gate circuits 215 to 219, inclusive, operates a different one of the parallel gates 210 to 214, inclusive, to which it is connected. In the system of FIG. 5, the connections are shown for alternative day operation, for the purpose of regularly scheduling appointments on alternative days of the week. More specifically, the output of series gate 215 for the first day of the week is connected to energize the input of parallel gate 212 for the third day.

In a similar manner, the series gate 216 for the second day is connected to eneergize the input of parallel and gate 213 for the fourth day; and the series and gate 217 for the third day is connected to energize the parallel gate 214 for the fifth day. Thus, for alternative day operation, the series gates for each day is connected in feedback arrangement to energize the input of the parallel gate for the day after the following day. In operation, where the user wishes to automatically obtain the schedules or subschedules for every other day (alternative days), the user depresses the day of starting the program and then a keyboard keyswitch 220 labeled "alternative days". The closure of alternative day switch 220, energizes one input of all of the series gate circuits 215 to 219, inclusive, and the closure of the selected one of the keyboard switches for the chosen starting day energizes the second input of only the associated one of the series gate circuits 215 to 219, inclusive. Thus where the user choses to start at the first day of the week, and to obtain schedules for alternate days of that week, the user closes both switch 220 and 200 on the keyboard. The closure of both of these switches operates only the series and gate 215, since both its input lines are properly energized. Operation of gate circuit 215 energizes one input of parallel gate 212 for the third day. However, this parallel and gate 212 is not operated at that time since its second input does not receive the proper energization. Upon the shift register (FIG. 2) selecting the memory 210 for the first day for interrogation, the desired schedule or subschedule of stored data is outputted as disclosed in FIG. 2 or FIG. 3 above since switch 200 is closed. Thereafter, as the shift register (of FIG. 2 or FIG. 3) energizes the input line 223 to the third day memory, 205 (in its proper sequence) it energizes parallel and gate 212 to close, or operates the parallel gate circuit 212 for the third day, and thence commences interrogating the memory 205 for the third day to output the desired schedule or subschedule information. In the same manner as described, each one of the alternate days is interrogated in sequence, as controlled by the parallel and gating circuits as described, and by the shift register circuits as described above in FIG. 2 or FIG. 3, whereby every other day following the first selected day is interrogated to read out the desired schedule or subschedule for that day.

In the same manner, a plurality of series and gating circuits 232, 234 etc. are provided for regularly scheduling on a weekly period basis, and are controlled by keyboard operated switch 230. These gating circuits 232, 234 etc. energize the parallel and gate circuits on a week apart basis (day 1 of the first week to day one of the second week, and so forth). Similarly, series gating circuits 233, 235 etc. are provided for bimonthly scheduling, as controlled by a user operated keyboard switch 231, as shown. And gating circuits 233, 235 etc. energize the appropriate ones of the parallel and gates for the desired bimonthly time periods desired, thereby to enable automatic interrogation of those days spaced apart by this regular bimonthly interval, in the same manner generally described in the example of FIG. 5. Using an appropriate arrangement of series and parallel and gate circuits, it is observed that any desired program of spaced apart days can be read-out by merely selecting the day that begins the program and selecting the desired period or interval between the starting day and the next appointment day (weekly, monthly etc.)

FIG. 4 shows a portable unit embodying the present invention that is similar in appearance to that previously disclosed in earlier U.S. Pat. No. 4,162,610 referred to above, and in copending applications referred to. Although the screen 241 is shown as displaying only the schedule or subschedule for one day, it will be understood that the display will provide the schedules for a series of different days, as shown in FIG. 1 and described above. The unit 240 has a keyboard 242 for manual entry by the user of the month at keys 249; the days at 248; and other information and data by other keyswitches, such a key 243. Erase key 244, retain key 245, enter key 246, and others are provided, such as the period selection keys 220, 230, and 231, (FIG. 5) for scheduling at regular intervals or periods. If desired, the unit may also includ additional circuits, such as modems for communicating by telephone or radio, or/and computer and data processing facilities for the convenience of the user. The circuitry shown in FIGS. 2, 3, and 5 is illustrated in conventional block diagram functional form, and as presently contemplated uses available microchip circuitry for the memory, gating, and for controls for the inputting of information; the processing of the inputted of scheduling information; the read-out of the information; and the control of the various communicating devices, including one or more of the display, printer, and audible enunciator. The use of ROM, RAM, and various alternative chips, are now conventional matters of design technology, as are microprocessors for cycling and for processing of the data and controls, as is now customary. Various dedicated chips, or general purpose microchips can be used in implementing the invention in the manner described, to perform the desired functions. Where the above description refers to switches or gates in the singular, it will be appreciated that multiple gate chips will conventionally be used, as well as presently available combinations of keyboards, and keyboards on circuit boards. The display screen or screens may employ large area LCD screens and associated display control circuits; or may employ plasma displays, or others now available as on the shelf components. Solid state memory chips with capacities up to 256K are now available on the open market and may be employed, as well as 32 bit microprocessors available from a number of different manufacturers. Audible enunciators of messages are also presently available in microchips, as are miniature thermal printers for printing records of the multiday schedules or subschedules.

Although portable dedicated units are desired to perform the scheduling functions as described, it will be appreciated that non-dedicated general purpose electronic microcircuits may be employed having built-in scheduling circuitry as described and disclosed in this application.

I claim:

1. In an automatic appointment scheduler for storing a series of different time-of-day appointments each time period for a series of different time periods, and including a memory for storing the appointments,
    an automatically operating interrogator circuit for interrogating the memory for a selected time period,
    said automatically operating interrogator circuit automatically selecting one available time slot from plural time slots that are available for appointment,
    and a communication means for automatically presenting to a user the available time slot for the time period selected.

2. In the scheduler of claim 1, the communication means comprising a visual display for automatically displaying the unscheduled time slot available for appointment.

3. In the scheduler of claim 1, the automatically operating interrogator reading out the first available time slot not scheduled for appointment on the selected time period.

4. In an automatic electronic appointment scheduler for storing a series of different time-of-day appointments each day for a series of days, and including a memory portion for each different day,
    an automatically operating interrogator circuit for interrogating each of the plural day memory portions for each of a series of different days selected by a user,
    and automatically reading-out for each of the selected days scheduling information concerning the appointments previously made,
    and a combined communication means for presenting to the user in a combined manner the information being automatically read-out from each of the series of selected days, thereby enabling the user to concurrently obtain the desired appointment information for the series of selected days,
    said automatically operating interrogator reading-out for each selected day the first available time slot not yet scheduled for appointment,
    and said combined communication means automatically presenting to the user in a concurrent manner the first available time slots each day for the selected series of days.

5. In an automatic electronic appointment schedule for storing a series of different time-of-day appointments each day for a series of days, and including a memory portion for each day,
    an automatically operating interrogator circuit for interrogating the memory for each of a series of different days selected by a user,
    and automatically reading out for each of the selected days scheduling information concerning the appointments previously made,
    and a combined communication means for presenting to the user in a combined manner the information being automatically read out from each of the series of selected days, thereby enabling the user to concurrently obtain the desired appointment information for the series of selected days, said automatically operating interrogator reading out for each selected day one available time slot not yet scheduled for appointment, and said communication means presenting to the user a combined program of available time slots for the different days selected.

6. A multiday appointment program scheduler comprising:

an electronic memory for storing plural schedules of appointments for a plurality of different days, selection means under control of a user for selecting a series of the different days of interest that may consist of nonconsecutive days, interrogation means controlled by the selection of the series of days for reading out the appointment data for each of the days selected by the user, and combined communication means for presenting to the user in a combined manner the appointment data for all of the days selected, thereby providing the user with a scheduling program covering the series of selected days, said interrogation means automatically reading out for each one of the selected days one available time slot not yet scheduled for appointment, and combined communication means presenting to the user a program of available time slots for the selected series of days.

7. A multiday appointment program scheduler comprising:

an electronic memory for storing plural schedules of appointments for a plurality of different days, selection means under control of a user for selecting a series of the different days of interest, interrogation means controlled by the selection of the series of days for reading out the appointment data for each of the days selected by the user, and combined communication means for presenting to the user in a combined manner the appointment data for all of the days selected, thereby providing the user with a scheduling program covering the series of selected days, said selection means including a keyboard with keys for selecting a first day of the series and the period of time between the first day an a second day of the series.

8. A multiday appointment program scheduler comprising:

an electronic memory for storing plural schedules of appointments for a plurality of different days, selection means under control of a user for selecting a series of the different days of interest, interrogation means controlled by the selection of the series of days for reading out the appointment data for each of the days selected by the user, and combined communication means for presenting to the user in a combined manner the appointment data for all of the days selected, thereby providing the user with a scheduling program covering the series of selected days, and interrogation means automatically reading out for each of the selected days an available time slot not yet scheduled for appointment, and said combined communication means presenting to the user the available time slots for each day of the series selected, said communication means including a visual display, and said available time slots for the series of days presented in side-by-side arrangement on the visual display.

9. In anelectronic appointment scheduler for storing plural appointments each day for a series of different days, and including a keyboard for random entry of appointments by day and time-of-day, and including a memory for storing said entered appointments, and including interrogation and read out circuits that respond to keyboard read out commands for reading out and communicating to the user on demand scheduled appointment data, the improvement comprising:

multiday keyboard initiated selection permitting ther user to select a plurality of different days, memory interrogation circuitry responsive to multiday keyboard selection for reading out the scheduled appointment data for each of the multidays selected by the user, and combined communication for presenting to the user in combined form the appointment scheduling data for all of the different days selected by the user, said memory interrogation circuitry reading out for each selected one of the days a single time slot not yet scheduled for appointment, and said combined communication means presenting the multiday time slots to the user in combined manner.

10. In an automatic electronic appointment scheduler for storing a series of different time-of-day appointments each day for a series of days, and including a memory portion for each different day, an automatically operating interrogator eircuit for interrogating each of the plural day memory portions for each of a series of different days selected by a user, and automatically reading out for each of the selected days scheduling information concerning the appointments previously made, and a combined communication means for presenting to a user in a combined manner the information being automatically read out from each of the series of selected days, thereby enabling the user to concurrently obtain the desired appointment information for a series of days of interest, the series of days selected being spaced apart by equal time intervals, and the selection means enabling the user to selected the first day of the series of days and the interval between days.

11. In the scheduler of claim 1, a keyboard for enabling a user to select at least one time period of interest.

12. In the scheduler of claim 11, said keyboard enabling the selection of at least two time periods of interest that may be nonconsecutive time periods.

13. In the scheduler of claim 12, said automatically operating interrogator circuit interrogating the memory for each of the different time periods and reading out for each such period at least one available time slot not yet scheduled for appointment.

14. In the scheduler of claim 13, said communication means automatically presenting to the user the available time slot for each time period and identifying the different time period for each availability.

15. In the scheduler of claim 14, said keyboard having keys for selecting a first time period and for selecting a time interval between the first time period and a later time period.

16. In the scheduler of claim 15, the addition of means for supplying additional information concerning the time slots to said communicating means.

17. In the scheduler of claim 16, said additional information including at least one of a person, and event, a month, a year, and an identification that the time slot being communicated is an available time slot.

18. In claim 1, said communication means including an audible annunciator.

19. In claim 1, said automatically operating interrogator circuit sequentially interrogating the memory for a plurality of time periods selected by a user, and sequentially reading out an available time slot for each such time period if one is available, and said communicating means including an audible annunciator for sequentially announcing the available time slots for each said time period.

20. In claim 1, means for enabling a user to subsequently enter an appointment into memory at said available time slot.

21. An electronic appointment scheduler having the capability of storing a number of appointments for each different day or time period for a number of different days or time periods, said scheduler comprising a small, unitary electronic device having a dedicated keyboard and electronic circuits including an electronic memory and a multiline visual display, said scheduler enabling the random entry of a series of appointments for each different day or time period into the memory by keyboard selections, said keyboard enabling a user to substantially concurrently choose a plurality of different days or time periods that may be non-consecutive days or time periods, multiple day or time period read-out circuits coupling the memory and the keyboard, and responsive to the multiple day selections to read-out the memory, said read-out circuits being responsive to the keyboard selection of one of said multiple days or time periods to interrogate the memory for that choosen day or time period to read-out one of the schedule of plural appointments for that day or time period or the subschedule of available time slots for that choosen day or time period, said read-out circuits being concurrently responsive to the keyboard selection of a second one of said days or time periods to interrogate the memory for that second choosen day or time period to read-out one of the schedule of plural appointments for that second choosen day or time periods or the subschedule of available time slots for that second choosen day or time period, and said read-out circuits substantially concurrently applying the read-out shedules for the choosen day or time period and the second choosen day or time period to different locations on said multiline visual display, whereby the visual display concurrently presents to the user in a combined manner the plural schedules or subschedules for both of the choosen days or time periods selected by the user.

22. A multiple day electronic appointment scheduler having the capability of storing a series of appointments each day or time period for a number of different days or time periods, and substantially concurrently reading-out such schedules or subschedules of availabilities for multiple days or time periods, said scheduler comprising a small electronic device having a keyboard, a multiple line visual display, and dedicated electronic circuits including an electronic memory and read-out circuits coupling the memory, keyboard, and visual display, said memory storing a series of different appointments each different day or time period, and for a number of different days or time periods, as may be randomly entered by the keyboard, said keyboard enabling a user to choose a number of different days or time periods, that may be non-consecutive days or time periods, for substantially concurrent read-out and display of schedules of appointments or subschedules of available time slots for the choosen days or time periods, said read-out circuits circuits being responsive to the keyboard selection of a first one of said days or time periods to interrogate the memory for that choosen day or time period to read-out the entire schedule of plural appointments for that day or time period or the entire subschedule of available time slots for that choosen day or time period, said read-out circuits being responsive to the keyboard selection of a second one of said days or time periods to interrogate the memory for that second choosen day or time period, that may be non-consecutive with the first choosen day, to read-out the entire schedule of plural appointments for that second day or time period or the entire subschedule of available time slots for that choosen second day or time period, and said read-out circuits substantially concurrently applying the entire schedules or subschedules for the choosen first and second days to different areas on the multiple line display screen, thereby to concurrently present to the user in a combined manner a visual display showing the entire schedules or subschedules for both of the choosen first and second days or time periods.

* * * * *